Oct. 24, 1967    D. J. BRIGNOLA    3,348,444
EXPANSION FASTENER WITH DUAL THREADED ENGAGEMENT MEANS
Filed Oct. 28, 1965
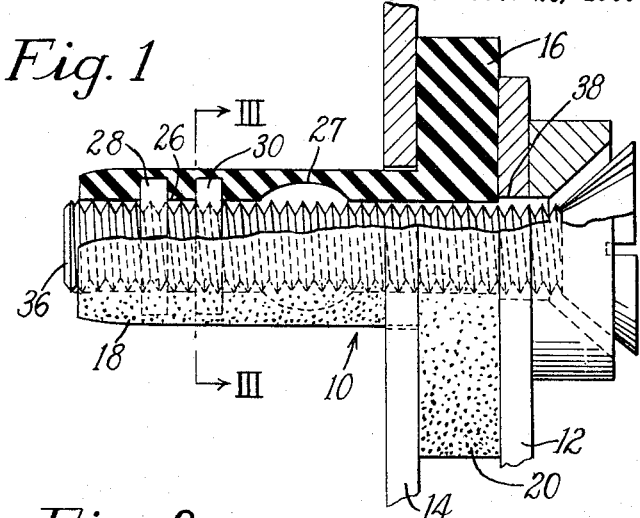
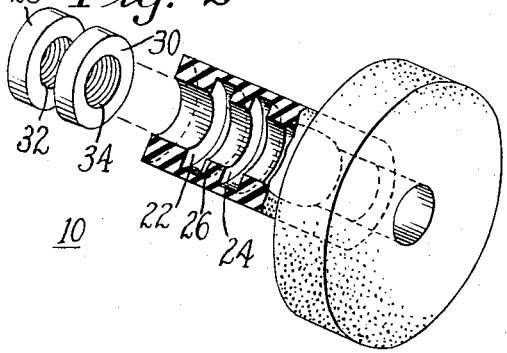
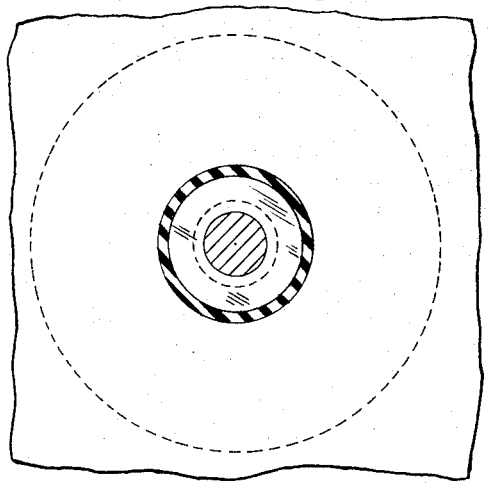
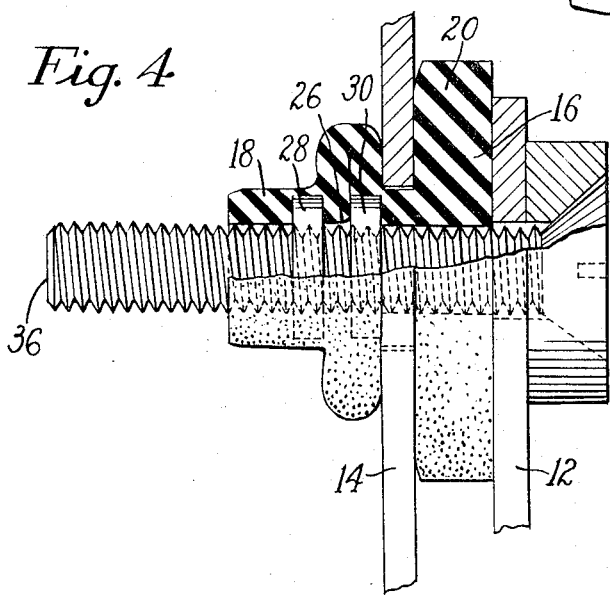
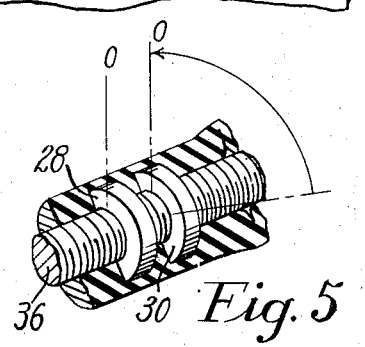
Inventor
Dominic J. Brignola
By his Attorney
Robert E. Ross

United States Patent Office 3,348,444
Patented Oct. 24, 1967

3,348,444
EXPANSION FASTENER WITH DUAL THREADED
ENGAGEMENT MEANS
Dominic J. Brignola, Phoenixville, Pa., assignor to United
Shoe Machinery Corporation, Flemington, N.J., a corporation of New Jersey
Filed Oct. 28, 1965, Ser. No. 505,486
5 Claims. (Cl. 85—70)

ABSTRACT OF THE DISCLOSURE

An expandable fastener including a flange head and resilient barrel having internally at one end thereof a plurality of spaced apart nut means. The nut means receive a screw which shortens and deforms the barrel. Also the nut means are moved axially toward each other to compress that portion of the barrel therebetween.

---

This invention relates generally to fastening devices and has particular reference to a fastening device adapted to be assembled into an aperture in a support without access to the rear side of said support.

One known device representative of the prior art comprises a fastener of this type which comprises generally a tubular barrel formed of rubber, having a flange at one end and a nut member disposed in the barrel at the end opposite the flange to receive a threaded member such as a bolt.

Although this device has achieved considerable commercial success, it has a number of disadvantages which has prevented its use in some applications.

One disadvantage results from the fact that the nut must be molded in place in the barrel, rather than assembled after molding. This procedure requires a longer cycle time than would be required to mold the rubber portion alone and therefore considerably increases the cost of the device. Although devices of this type have been made experimentally by molding a barrel with an internal recess and subsequently assembling a nut into the recess, such method has been found to be unsatisfactory in that when a bolt is tightened into the nut, the nut pulls through the barrel aperture rather than causing bulging of the barrel wall. Hence no holding power is obtained.

An object of this invention is to provide a blind fastener in which bolt engaging means is assembled into a resilient barrel, with means being provided for preventing movement of the bolt engaging means out of its assembled position in the barrel.

A further object of the invention is to provide a blind fastener of the type described in which bolt engaging means assembled into a resilient barrel has means for engaging an internal portion of the barrel to prevent substantial axial movement of the bolt engaging means therein.

A further object of the invention is to provide a blind fastener in which a resilient barrel is provided with bolt engaging means having two separate portions disposed in spaced relation which are adapted to grip therebetween an internal portion of the resilient barrel.

With the above and other objects in view, as will hereinafter appear, the present invention in one aspect thereof contemplates a fastening device adapted for assembly into an aperture in a support panel. The device includes a body formed of resilient and deformable material and including a hollow barrel having a flange at one end. A plurality of nut means are disposed in the barrel and spaced from the flange. The device is adapted to receive a screw through the barrel and into the nut means. Turning of the screw causes the barrel to shorten and bulge outwardly. In addition, the nut means are responsive to the turning of the screw therein to cause gripping of an internal portion of the barrel between at least two of the nut means.

The above and other features of the invention, including various novel details of construction and combinations of parts, will now be particularly described with reference to the accompanying drawings and pointed out in the claims.

In the drawings,

FIG. 1 is a view in side elevation, partly in section, of a fastening device embodying the features of the invention positioned in an aperture in a support panel;

FIG. 2 is an exploded view of the components of the fastener prior to assembly;

FIG. 3 is a view in section taken on line III—III of FIG. 1;

FIG. 4 is a view similar to FIG. 1 after the fastener has been attached to the support panel; and FIG. 5 is a perspective view, partly broken away, of the portion of the barrel containing the nut members illustrating the relative rotation of the nut members during attachment of the fastener to a support.

Referring to the drawing, there is illustrated a blind fastener 10 which is adapted for use in attaching an article 12 to a support panel 14. The fastener 10 comprises a resilient member 16 molded of rubber, plastic, or the like and having a hollow barrel portion 18 with a flange 20 disposed at one end thereof. Formed within the barrel near the end opposite the flange are a pair of circumferential recesses 22 and 24 disposed in spaced relation and separated by an internal peripheral rib 26.

To assist in starting the collapse and outward bulging of the barrel an arcuate recess 27 is provided on the inner surface of the barrel between the recess 24 and the flange 20.

Assembled in the recesses 22 and 24 respectively are nuts 28 and 30 having aligned threaded openings 32 and 34 to receive a screw 36. The nut 30 has an outer periphery which is circular for a purpose to appear hereinafter.

In the illustrated embodiment the nuts 28 and 30 are slightly larger than the recesses so as to be frictionally gripped by the barrel to prevent rotation thereof when the screw is inserted, except in a manner to be described hereinafter.

To utilize the fastener in attaching an article to the panel 14, the barrel 18 is inserted into a suitable aperture 38 in the panel. The screw 36 is inserted through a suitable aperture 40 in the article 12 to be attached and into the barrel 18 and rotated into engagement with the threaded openings 32 and 34 of the nuts 28 and 30. When the screw has been tightened sufficiently that its head bears against the article 12, further tightening causes the nuts 28 and 30 to move up the screw toward its head, causing the barrel 18 to bulge outwardly in the manner shown in FIG. 4 and bear against the rear side of the panel 14 so that the article is securely and resiliently retained in assembly with the support panel.

Although previous fasteners of this type utilizing a single nut assembled into the barrel have been found unsatisfactory it has been unexpectedly found that the disclosed structure, utilizing two spaced nuts, has a holding power equal to or exceeding that of fasteners in which the nut is molded in plan in the barrel.

For example, a fastener made in accordance with the present invention, for use with a 10-32 screw, when assembled into an opening in a steel plate and tightened to 7 inch pounds of torque, held 400 pounds in tension before failure.

A fastener made in accordance with the prior art, as described in the above identified patent, of the same size and tightened to the same torque value, held only 300 pounds before failure.

A fastener of the same size utilizing a single nut assembled into a recess on the interior of the barrel could not be tightened to 7 inch pounds torque, since the nut pulled through the barrel, and no bulging of the barrel wall resulted. Hence no holding power was obtained.

It is believed that the exceptional holding power of the fastener disclosed herein is due to the fact that as the screw is tightened in the nuts, the nuts move closer together on the screw and grip the rib 26 tightly as seen in FIG. 4, so that the nuts cannot move axially through the barrel. It has been confirmed by X-ray photographs that the distance between the nuts decrease by about 10% as the screw is tightened, as shown in the drawing.

A decrease by 10% of the distance between the nuts necessarily means that the rubber rib 26 therebetween is compressed by 10%. The force necessary to provide this compression is sufficient to provide adequate gripping strength to retain the rib between the nuts as the screw 36 is tightened.

A decrease in distance between the nuts can only result from rotation of the nuts relative to each other. The reason for such relative rotation is not entirely clear, but is believed to be due to the fact that, as the screw is tightened, the nuts initially are stationary, with the screw rotating through the apertures. As the tension on the screw increases, the friction between the screw and the threads increases until it is greater than the friction between the periphery of the nut and the surrounding barrel. Since the barrel tends to bulge between the nut 30 and the panel, the friction between the nut 30 nearest the panel and the barrel will be less than that between the further nut 28 and the barrel. When the screw thread friction exceeds the peripheral friction, the nut 30 will rotate with the screw for a small angle of rotation, (while the nut 28 remains stationary) so that the nut 30 moves with the screw toward the nut 28. After only a small amount of such movement which causes the aforementioned compression of the ridge 26, the friction of the nut 30 against the rubber ridge 26 becomes great enough that no further rotation of the nut is possible, and thereafter the nuts move together up the screw, pulling the end of the barrel toward the panel.

Although in the illustrated embodiment the nuts 28 and 30 have a circular outer periphery, it will be understood that they may have other shapes provided only that the nut 30 is capable of the required amount of rotation in the recess 24.

Since certain obvious changes may be made in the illustrated embodiment of the device without departing from the scope of the invention, it is intended that all matter contained herein be interpreted in an illustrative and not a limiting sense.

Having thus described my invention, what I claim as new and desire to secure by Letters Patent of the United States is:

1. A fastening device adapted for assembly into an aperture in a support panel, said device comprising a body formed of resilient and deformable material comprising a hollow barrel having a flange at one end and a plurality of nut means disposed in the barrel in spaced relation to the flange, said device being adapted to be assembled with the support by the rotation of a screw through the barrel into the nut means whereby the barrel shortens and is bulged outwardly, said nut means being responsive to the tightening of the screw therein to cause gripping of an internal portion of the barrel between at least two of the nut means.

2. A fastening device adapted for assembly into an aperture in a support panel, comprising a body having a hollow barrel formed of resilient and deformable material, a flange at one end of the body and a pair of nut means disposed in the barrel to receive a screw, said nut means being spaced apart with an internal portion of the barrel disposed between peripheral portions of the nuts, said nut means nearest the flange being frictionally restrained against rotation by engagement of the barrel but being rotatable in relation to the barrel on application of a predetermined amount of torque thereto.

3. A fastening device as set forth in claim 2 in which said barrel has a pair of internal peripheral recesses spaced apart by an internal peripheral rib, and said nuts are disposed in said recesses and frictionally retained therein.

4. A fastening device adapted for assembly into an aperture in a support panel, said device comprising a hollow elongated barrel formed of resilient and deformable material and having a flange at one end of the body, said barrel having a pair of internal circumferentially extending recesses near the other end spaced longitudinally to form a circumferential ridge therebetween, and a nut member assembled into each recess, at least the nut member nearest the flange being retained only by frictional engagement with the barrel and being capable of rotation in relation to the other nut member when a predetermined torque is applied thereto to cause said ridge to be gripped between the nut members.

5. A fastening device as set forth in claim 4 in which said barrel has an internal concavity between the flange and the nut nearest the flange to facilitate outward bulging of the barrel wall when a screw is tightened into the nuts.

References Cited
UNITED STATES PATENTS

| | | | |
|---|---|---|---|
| 830,956 | 9/1906 | Bagge | 85—61 |
| 2,409,702 | 10/1946 | Luce | 85—71 |
| 2,521,065 | 9/1950 | Kempton | 85—71 |
| 2,562,336 | 7/1951 | Seldin | 85—70 |
| 3,014,563 | 12/1961 | Bratton | 85—70 |

CARL W. TOMLIN, *Primary Examiner.*

MARION PARSONS, JR., *Examiner.*